United States Patent
Lin et al.

(10) Patent No.: US 12,100,169 B2
(45) Date of Patent: Sep. 24, 2024

(54) SPARSE OPTICAL FLOW ESTIMATION

(71) Applicant: QUALCOMM Incorporated, San Diego, CA (US)

(72) Inventors: Jamie Menjay Lin, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 17/481,047

(22) Filed: Sep. 21, 2021

(65) Prior Publication Data

US 2022/0101539 A1 Mar. 31, 2022

Related U.S. Application Data

(60) Provisional application No. 63/085,928, filed on Sep. 30, 2020.

(51) Int. Cl.
*G06T 7/269* (2017.01)
*G01P 13/00* (2006.01)
*G06T 7/246* (2017.01)

(52) U.S. Cl.
CPC .............. *G06T 7/269* (2017.01); *G01P 13/00* (2013.01); *G06T 7/248* (2017.01); *G06T 2207/20081* (2013.01); *G06T 2207/20084* (2013.01)

(58) Field of Classification Search
CPC ...... G06T 7/269; G06T 7/248; G06T 2207/20081; G06T 2207/20084; G06T 2207/10024; G06T 2207/20016; G06T 2207/20076; G06T 7/215; G06T 2207/10016; G06T 2207/20021; G01P 13/00

USPC ......................................................... 382/107
See application file for complete search history.

(56) References Cited

U.S. PATENT DOCUMENTS

| 8,902,359 B1 * | 12/2014 | Biswas | ............... H04N 7/0132 |
| | | | 348/452 |
| 2018/0137632 A1 | 5/2018 | Takada | |
| 2020/0193609 A1 * | 6/2020 | Dharur | .................... G06T 7/143 |

FOREIGN PATENT DOCUMENTS

| JP | 2020522200 | * | 7/2020 | ........... H04N 19/577 |
| KR | 100943719 | * | 2/2010 | ............. H04N 13/00 |
| WO | 2020155713 A1 | | 8/2020 | |

OTHER PUBLICATIONS

Anonymous: "Deep Learning Processor", Wikipedia, Sep. 3, 2020 (Sep. 3, 2020), pp. 1-7, XP055869420, p. 1, paragraph 2.

(Continued)

*Primary Examiner* — Jerome Grant, II
(74) *Attorney, Agent, or Firm* — Polsinelli/Qualcomm

(57) ABSTRACT

Systems and techniques are described herein for performing optical flow estimation between one or more frames. For example, a process can include determining a subset of pixels of at least one of a first frame and a second frame, and generating a mask indicating the subset of pixels. The process can include determining, based on the mask, one or more features associated with the subset of pixels of at least the first frame and the second frame. The process can include determining optical flow vectors between the subset of pixels of the first frame and corresponding pixels of a second frame. The process can include generating an optical flow map for the second frame using the optical flow vectors.

30 Claims, 8 Drawing Sheets

(56) References Cited

OTHER PUBLICATIONS

International Search Report and Written Opinion—PCT/US2021/051582—ISA/EPO—Jan. 7, 2022.
Koniarski K., "Augmented Reality Using Optical Flow", 2015 Federated Conference on Computer Science and Information Systems (FEDCSIS), Polish Information Processing Society (PIPS), Sep. 13, 2015, pp. 841-847, XP032812716, DOI: 10.15439/2015F202 [retrieved on Nov. 5, 2015], abstract.
Philippe W., et al., "DeepFlow: Large Displacement Optical Flow with Deep Matching", Proceedings of the IEEE International Conference on Computer Vision (ICCV), IEEE, Dec. 1, 2013, pp. 1385-1392, XP032573088, ISSN: 1550-5499, DOI: 10.1109/ICCV.2013.175 [retrieved on Feb. 28, 2014], abstract, figures 1,4,5,6, sections 3, 3.1, 3.2.
Tu Z., et al., "A Survey of Variational and CNN-based Optical Flow Techniques", Signal Processing, Image Communication, vol. 72, Mar. 1, 2019, pp. 9-24, XP055726825, NL, ISSN: 0923-5965, DOI: 10.1016/j.image.2018.12.002, abstract, sections 1.3.3, 5.

\* cited by examiner

SPARSE OPTICAL FLOW ESTIMATION

CROSS-REFERENCE TO RELATED APPLICATIONS

The present application claims the benefit of U.S. Provisional Application No. 63/085,928, filed Sep. 30, 2020, entitled "SPARSE OPTICAL FLOW ESTIMATION," which is hereby incorporated by reference in its entirety and for all purposes.

FIELD

The present disclosure generally relates to optical flow estimation. In some examples, aspects of the present disclosure are related to performing sparse optical flow estimation.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A common type of processing performed on a sequence of frames is motion estimation, which involves tracking the motion of objects or points across multiple frames. For example, motion estimation can include determining an optical flow map that describes the displacement of pixels in a frame relative to corresponding pixels in previous frames. Motion estimation can be used in various applications, including computer vision systems, extended reality (XR) systems, data compression, image segmentation, autonomous vehicle operation, among other applications.

SUMMARY

Systems and techniques are described for performing sparse optical flow estimation for frames, for example based on a subset of pixels and/or regions within the frames. In one illustrative example, a method of optical flow estimation between one or more frames is provided. The method includes: determining a subset of pixels of at least one of a first frame and a second frame; generating a mask indicating the subset of pixels; determining, based on the mask, one or more features associated with the subset of pixels of at least the first frame and the second frame; determining optical flow vectors between the subset of pixels of the first frame and corresponding pixels of the second frame; and generating an optical flow map for the second frame using the optical flow vectors.

In another example, an apparatus for encoding video data is provided that includes a memory and one or more processors (e.g., implemented in circuitry) coupled to the memory. In some examples, more than one processor can be coupled to the memory and can be used to perform one or more of the operations described herein. The one or more processors are configured to: determine a subset of pixels of at least one of a first frame and a second frame; generate a mask indicating the subset of pixels; determine, based on the mask, one or more features associated with the subset of pixels of at least the first frame and the second frame; determine optical flow vectors between the subset of pixels of the first frame and corresponding pixels of the second frame; and generate an optical flow map for the second frame using the optical flow vectors.

In another example, a non-transitory computer-readable medium is provided for encoding video data, which has stored thereon instructions that, when executed by one or more processors, cause the one or more processors to: determine a subset of pixels of at least one of a first frame and a second frame; generate a mask indicating the subset of pixels; determine, based on the mask, one or more features associated with the subset of pixels of at least the first frame and the second frame; determine optical flow vectors between the subset of pixels of the first frame and corresponding pixels of the second frame; and generate an optical flow map for the second frame using the optical flow vectors.

In another example, an apparatus for encoding video data is provided. The apparatus includes: means for determining a subset of pixels of at least one of a first frame and a second frame; means for generating a mask indicating the subset of pixels; means for determining, based on the mask, one or more features associated with the subset of pixels of at least the first frame and the second frame; means for determining optical flow vectors between the subset of pixels of the first frame and corresponding pixels of the second frame; and means for generating an optical flow map for the second frame using the optical flow vectors.

In some aspects, the methods, apparatuses, and computer-readable medium described above comprise determining the subset of pixels of at least the first frame and the second frame using a machine learning algorithm.

In some aspects, determining the subset of pixels of at least the first frame and the second frame can include: identifying a first pixel of the first frame corresponding to a first region of interest; identifying a second pixel of the first frame corresponding to a second region of interest; and including the first pixel within the subset of pixels and excluding the second pixel from the subset of pixels.

In some aspects, determining the subset of pixels of at least the first frame and the second frame includes identifying at least one pixel corresponding to a boundary between two objects.

In some aspects, determining the subset of pixels of at least the first frame and the second frame includes sampling a predetermined number of pixels within the first frame.

In some aspects, the subset of pixels of at least the first frame and the second frame includes at least one pixel with adjacent pixels that are not included in the subset of pixels. In some cases, determining, based on the mask, the one or more features includes: determining feature information corresponding to the adjacent pixels of the at least one pixel; and storing the feature information corresponding to the adjacent pixels in association with the at least one pixel. In some examples, the methods, apparatuses, and computer-readable medium described above comprise determining an optical flow vector between the at least one pixel and a corresponding pixel of the second frame using the feature information corresponding to the adjacent pixels.

In some aspects, the methods, apparatuses, and computer-readable medium described above comprise: determining importance values for frames within a sequence of frames including the first frame and the second frame; and selecting a frame within the sequence of frames for performing optical flow estimation based on the importance values. In some cases, the methods, apparatuses, and computer-readable medium described above comprise selecting the second frame for performing optical flow estimation based on determining an importance value of the second frame exceeds a threshold importance value.

In some aspects, the apparatus is, is part of, and/or includes a mobile device (e.g., a mobile telephone or so-called "smart phone" or other mobile device), an extended reality (XR) device (e.g., a virtual reality (VR) device, an augmented reality (AR) device, or a mixed reality (MR) device), a personal computer, a laptop computer, a server computer, a camera, a vehicle or a computing device or component of a vehicle, a wearable device, a television (e.g., a network-connected television), or other device. In some aspects, the apparatus includes a camera or multiple cameras for capturing one or more frames or images. In some aspects, the apparatus includes a display for displaying one or more frames or images, virtual content, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
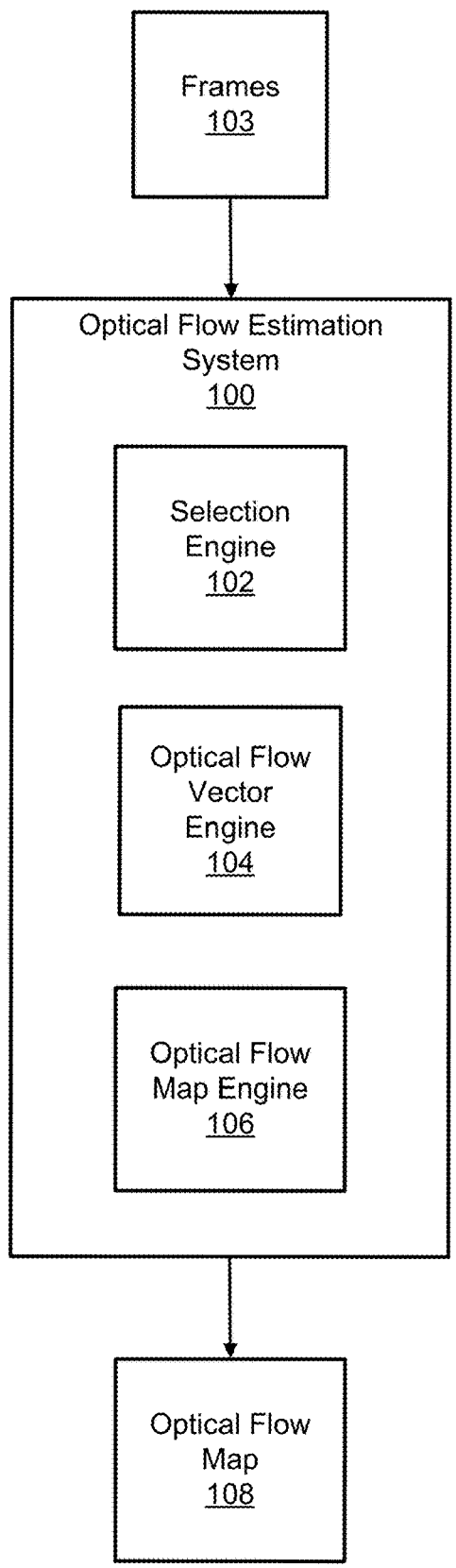
FIG. 1 is a block diagram illustrating an example optical flow estimation system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Motion estimation (also referred to herein as optical flow estimation) is the task of tracking the movement of one or more regions (e.g., an object or part of an object, an instance or a part of an instance, a background portion of a scene or a part of the background portion, etc.) across a sequence of frames. For example, an optical flow estimation system can identify a pixel of an initial frame that corresponds to a portion of a real-world object. The optical flow estimation system can determine a corresponding pixel (e.g., a pixel that depicts the same portion of the real-world object) within a subsequent frame. The optical flow estimation system can estimate motion of the object between the frames by determining an optical flow vector that corresponds to the displacement and/or distance between the pixel in the initial frame and the corresponding pixel in the subsequent frame. For instance, the optical flow vector can indicate the displacement (e.g., corresponding to the direction and distance of movement) between coordinates corresponding to the initial pixel and coordinates corresponding to the subsequent pixel.

An optical flow map can include one or more optical flow vectors corresponding to motion between two frames. In some cases, optical flow estimation systems may determine optical flow maps that include an optical flow vector for each pixel (or approximately each pixel) within a frame. Such optical flow maps can be referred to as dense optical flow maps. In some cases, large amounts of time and/or computing power may be required to generate dense optical flow maps, which may be detrimental for many applications of motion estimation.

Examples of applications that utilize motion estimation include various computer vision tasks and camera applications where pixel motion (corresponding to motion of an object) is involved. Examples of such applications include video recognition, autonomous driving, video compression, object and/or scene tracking, visual inertial odometry (VIO), video object segmentation, extended reality (XR) (e.g., virtual reality (VR), augmented reality (AR), and/or mixed reality (MR)), among others. Higher performance of optical flow estimation for execution in chips and/or devices is desirable, including higher accuracy, less computational complexity, lower latency, lower power consumption, less memory size requirements, among others.

As described, optical flow can include a dense correspondence estimation problem between a pair of frames or images. Existing solutions generally compute dense optical flow for an entire frame or image (e.g., all pixels in the frame or image), which can lead to various issues. A first issue is that uniform (or homogeneous) processing across all pixels and all frames in the video sequence may result in unnecessarily high computation complexity, high latency, high power consumption, and/or high memory usage/requirements (e.g., a large memory may be required). Another issue is that uniform (homogeneous) processing across all pixels in a frame or image may lead to degraded accuracy performance. For example, degraded accuracy performance may result due to oversampling in smooth regions and undersampling in boundary or discontinuous regions.

Systems, apparatuses, methods, and computer-readable media (collectively referred to as "systems and techniques") are described herein for performing sparse optical flow estimation for frames. A frame can also be referred to herein as an image. In some cases, an optical flow estimation system can determine a subset of pixels for performing optical flow estimation. The optical flow estimation system can generate a sparse optical flow map based on the subset of pixels. For instance, the optical flow estimation system can perform a differential and attentional field masking technique to predict or identify spatial regions or temporal frames that are significant in terms of optical flow estimation (e.g., regions with movement). Pixels identified using the field masking technique can be identified using a mask, which in some cases can be referred to as a field mask or an attentional field mask. The optical flow estimation system can target pixels in regions of one or more frames (e.g., only pixels in the regions) indicated by the mask for optical flow estimation. In some examples, a mask can be refined (e.g., in terms of resolution) to indicate regions for further flow estimation refinement.

Because the systems and techniques described herein perform optical flow estimation for significantly fewer pixels than conventional full frame optical flow estimation, the systems and techniques can generate optical flow maps with reduced latency and/or fewer computing resources. For example, the systems and techniques described herein can result in optical flow estimation being performed for 50% of the pixels within a frame, 40% of pixels within a frame, 5% of the pixels within a frame, 0% of the pixels (no pixels) within a frame, or any other number based on the techniques described herein.

As noted above, the optical flow estimation system can determine a subset of pixels of a frame for which to perform optical flow estimation. In one example, the subset of pixels can correspond to relevant and/or important features within the frame. For instance, the subset of pixels can correspond to objects that are in the foreground of the frame, objects that are moving within the frame, objects with particular labels, and/or other objects within the frame. In another example, the subset of pixels can correspond to edges of objects and/or boundaries between objects. In some cases, the optical flow estimation system can determine relevant and/or important pixels using one or more machine learning systems and/or algorithms. For instance, as described in more detail below, a neural network-based machine learning system and/or algorithm (e.g., a deep neural network) can be used to determine relevant and/or important pixels of a frame.

Further details regarding systems for sparse optical flow estimation are provided herein with respect to various figures. FIG. 1 is a diagram illustrating an example of an optical flow estimation system 100 that can perform an optical flow estimation process. The optical flow estimation system 100 includes various components, including a selection engine 102, an optical flow vector engine 104, and an optical flow map engine 106. The components of the optical flow estimation system 100 can include electronic circuits or other electronic hardware, which can include one or more programmable electronic circuits (e.g., microprocessors, graphics processing units (GPUs), digital signal processors (DSPs), central processing units (CPUs), or other suitable electronic circuits), computer software, firmware, or any combination thereof, to perform the various operations described herein. While the optical flow estimation system 100 is shown to include certain components, one of ordinary skill will appreciate that the optical flow estimation system 100 can include more or fewer components than those shown in FIG. 1. For example, the optical flow estimation system 100 may also include, in some instances, one or more memory (e.g., RAM, ROM, cache, buffer, and/or the like) and/or processing devices that are not shown in FIG. 1.

The optical flow estimation system 100 can be part of a computing device or multiple computing devices. In some cases, the computing device (or devices) that includes the optical flow estimation system 100 can also include one or more wireless transceivers for wireless communications and/or a display for displaying one or more frame or images. In some examples, the computing device that includes the optical flow estimation system 100 can be an electronic device, such as a camera (e.g., a digital camera, an IP camera, a video camera, a camera phone, a video phone, or other suitable capture device), a mobile or stationary telephone handset (e.g., smartphone, cellular telephone, or the like), a desktop computer, a laptop or notebook computer, a tablet computer, an XR device, a vehicle or a computing device or component of a vehicle, a set-top box, a television, a display device, a digital media player, a video gaming console, a video streaming device, or any other suitable electronic device.

The optical flow estimation system 100 can obtain frames 103 as input. In some examples, the optical flow estimation system 100 can perform the optical flow estimation process in response to one or more of the frames 103 being captured by a camera or a computing device that includes a camera (e.g., a mobile device, or the like). The frames 103 can include a single frame or multiple frames. For instance, the frames 103 can include a video frame of a video sequence or a still image of a set of consecutively captured still images. In one illustrative example, a set of consecutively captured still images can be captured and displayed to the user as a preview of a scene that is in the field-of-view of the camera, which can help the user decide when to provide input causing an image to be captured for storage. In another illustrative example, a set of consecutively captured still images can be captured using a burst mode or other similar mode that captures multiple consecutive images. A frame can be a red-green-blue (RGB) frame having red, green, and blue color components per pixel, a luma, chroma-red, chroma-blue (YCbCr) frame having a luma component and two chroma (color) components (chroma-red and chroma-blue) per pixel, or any other suitable type of color or monochrome picture.

In some examples, the optical flow estimation system 100 can capture the frames 103. In some examples, the optical flow estimation system 100 can obtain the frames 103 from a frame source (not shown in FIG. 1). In some cases, the frame source can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the optical flow estimation system 100.

In some implementations, the optical flow estimation system 100 and the frame source can be part of the same computing device. For example, in some cases, a camera, phone, tablet, extended reality (XR) device (e.g., a virtual reality (VR) device, an augmented reality (AR) device, a mixed reality (MR) device, or the like), and/or other device including a frame or image source (e.g., a camera, storage, or the like) can include an integrated optical flow estimation system. In some implementations, the optical flow estimation system 100 and the frame source can be part of separate computing devices. In one illustrative example, the frame source can include one or more cameras, and the computing device including the optical flow estimation system 100 can include a mobile or stationary telephone handset, a desktop computer, a laptop or notebook computer, a tablet computer, or other computing device.

In some examples, the optical flow estimation performed by the optical flow estimation system 100 can be performed using a single camera system of a computing device. In other examples, the optical flow estimation performed by the optical flow estimation system 100 can be performed using a dual camera system of a computing device. In some cases, more than two cameras can be used in a camera system for performing optical flow estimation.

The optical flow estimation system 100 can process frames 103 to generate an optical flow map (e.g., an optical flow map 108) by performing optical flow estimation for pixels within a frame of the frames 103. The optical flow map 108 can include one or more optical flow vectors corresponding to the movement of pixels between two frames. In some cases, the two frames can be directly adjacent frames within a series of frames. In some cases, the two frames can be separated by one or more intermediate frames (which can be referred to as non-adjacent frames). In some cases, the optical flow map 108 can include optical flow vectors corresponding to a subset of the pixels of the frames. For example, the optical flow map 108 can be a sparse optical flow map that includes optical flow vectors corresponding to only a portion of the pixels within the frames. In an illustrative example, the optical flow map 108 can include optical flow vectors for 50% of the pixels within the frames. One of ordinary skill will appreciate that the optical flow map 108 may include optical flow vectors for any other subset of pixels within frames, such as 0% of the pixels, 10% of the pixels, 40% of the pixels, 70% percent of the pixels, or other number.

The selection engine 102 can process a frame to select a subset of the pixels of the frame for which to perform optical flow estimation. The subset of pixels may be represented by a mask. For instance, the optical flow estimation system 100 can perform optical flow estimation for pixels included within the mask, and not for pixels outside the mask. In one example, the selection engine 102 can determine a mask by sampling a subset of pixels. For instance, the selection engine 102 can sample a predetermined number of pixels (e.g., 10 pixels, 100 pixels, etc.) of the frame. In other examples, the selection engine 102 can determine a mask that includes pixels corresponding to important and/or relevant features of the frame. These features can be referred to as key features. In some cases, such key features are associated with movement (e.g., features that are typically associated with movement within a scene). Masks corresponding to one or more key features can be referred to as differential field masks and/or attentional field masks. For example, the selection engine 102 can identify pixels corresponding to objects in the foreground of the scene (rather than objects in the background of the scene). Additionally or alternatively, in another example, the selection engine 102 can identify pixels corresponding to moving objects (rather than stationary objects). Additionally or alternatively, in another example, the selection engine 102 can identify pixels corresponding to boundaries between two objects. Additionally or alternatively, in a further example, the selection engine 102 can select pixels corresponding to objects with certain labels and/or classifications. For instance, the selection engine 102 can classify and/or label objects in the frame (e.g., using any type or form of object recognition technique, such as using one or more classification neural networks). Based on the classifications and/or labels, the selection engine 102 can determine pixels corresponding to important objects (e.g., a person's face identified using an object recognition technique).

In some cases, the selection engine 102 can select the subset of pixels to be included within the mask using a machine learning system and/or algorithm. For example, the machine learning system and/or algorithm can be any type or form of deep neural network (DNN). In an illustrative example, the machine learning algorithm can include a Visual Geometry Group (VGG) algorithm. In another illustrative example, the machine learning system and/or algorithm can include a residual neural network (ResNet). Any other machine learning system and/or algorithm can be used. The machine learning system and/or algorithm (e.g., a DNN, such as a VGG, ResNet, etc.) can be trained to determine features of objects within frames. The features can include object labels, object classifications, object boundaries, among other features. In some cases, the machine learning system and/or algorithm can be trained (e.g., using supervised training with backpropagation) by inputting into the neural network many frames or images that have known object features. After the neural network has been sufficiently trained, the neural network can determine features of new frames (e.g., frames 103) input to the neural network during inference. Illustrative examples of neural networks and associated training are described herein with respect to FIG. 6 and FIG. 7.

In some examples, the selection engine 102 can determine a mask that includes a number of pixels (e.g., minimum number of pixels or an approximately minimum number of pixels) that is sufficient for accurate optical flow estimation. For example, the time and/or computing power required to perform optical flow estimation generally increases with the number of pixels involved in the optical flow estimation. Thus, it may be advantageous to decrease the number of pixels within a mask. To reduce the number of pixels within a mask without significantly and/or undesirably decreasing the quality of optical flow estimation, the selection engine 102 can determine pixels that are most relevant and/or useful for optical flow estimation. In some cases, selection of a subset of pixels may be based on at least two factors. As an example of a first factor, the selection engine 102 can perform selection based on regions (or pixels, whether consecutive or not) of interest. As an example of a second factor, the selection engine 102 can perform selection based on sufficiency for optical flow estimation given certain estimation quality constraints. The selection engine 102 can consider the regions of interest (or pixels), the estimation quality constraints, a combination thereof, and/or other factors when selecting subsets of pixels. In some examples, the selection techniques may include a differential field of two frames, intensity smoothness (or discontinuity), object regions and/or boundaries, semantic regions (e.g., foreground objects versus the background of the scene), semantic uncertainty, attention regions for activities, any combination thereof, and/or other properties.

For instance, the selection engine 102 can search for pixels corresponding to certain object features (e.g., pixels corresponding to edges of moving objects). In another example, the selection engine 102 can search for pixels within certain areas of a frame. For instance, the selection engine 102 can search for pixels within an area of the frame known to be the foreground. In another example, the selection engine 102 can select a subset of pixels with an approximately even distribution throughout the frame. In some cases, the selection engine 102 can search for a predetermined number of pixels. For instance, the selection engine 102 can determine the relative importance of all or a portion of the pixels of a frame and select a predetermined number or percentage of the most important pixels. In other cases, the selection engine 102 can dynamically select the number of pixels within a mask. For instance, the selection engine 102 can select a relatively high number of pixels for a frame that includes a relatively high number of moving objects and/or relatively fast motion. In an illustrative example, the selection engine 102 can determine a suitable number of pixels for a mask using dynamic programming. For instance, a dynamic programming algorithm can be used to solve one or more optimization problems under constraints. In one example, given certain available computation resources (e.g., in terms of a number of operations per time interval, certain allowed latency, certain allowed power consumption, etc.), the selection engine 102 can use a dynamic programming algorithm to find the best allocation or scheduling of resources to achieve a particular goal (e.g., to determine a suitable number of pixels or a mask), according to the constraints.

The optical flow vector engine 104 of the optical flow estimation system 100 can determine optical flow vectors corresponding to pixels identified by the mask. In some cases, an optical flow vector can indicate a direction and magnitude of the movement of the pixel. For example, an optical flow vector can describe a displacement between a coordinate corresponding to the location of the pixel within an initial frame and a coordinate corresponding to the location of the pixel within a subsequent frame. The optical flow vector engine 104 can determine the location of the pixel within the subsequent frame using any type or form of optical flow estimation technique. In an illustrative example, the optical flow vector engine 104 can determine an optical flow vector using a differential motion estimation technique (e.g., a Taylor series approximation). Additionally or alternatively, the optical flow vector engine 104 can determine an optical flow vector using a machine learning algorithm (e.g., a deep neural network). In some cases, the machine learning algorithm used to determine optical flow vectors can be different than the machine learning algorithm used to select the subset of pixels for the mask.

In some cases, the optical flow vector engine 104 can determine optical flow vectors between each pixel in a frame (referred to as a source frame) identified by the mask and corresponding pixels of a subsequent frame (referred to as a target frame). The optical flow map engine 106 of the optical flow estimation system 100 can generate values for the optical flow map 108 for the target frame based on the optical flow vectors. The values of the mask can indicate the displacement of the pixels within the subsequent target frame relative to the source frame. In some examples, the optical flow map engine 106 can determine values of the optical flow map 108 for the target frame using the optical flow vectors determined for the pixels in the target frame identified by the mask. In some examples, the optical flow map engine 106 can estimate values for other pixels in the target frame based on the optical flow vectors determined for the pixels identified by the mask. For instance, a flow upsampling technique can be performed to estimate values for the other pixels in the target frame. The flow upsampling technique is described in more detail below.

In some examples, the optical flow map engine 106 can generate an incremental optical flow map that corresponds to motion estimations between two adjacent frames. In other examples, the optical flow map engine 106 can generate a cumulative optical flow map (in which case the optical flow map is adjusted or updated at each frame) that corresponds to motion estimations between two frames having one or more intermediate frames between them. For example, the optical flow map engine 106 can determine incremental optimal flow maps between all or a portion of directly adjacent frames within a series of frames. The optical flow map engine 106 can use the incremental optimal flow maps to update a cumulative optical flow map between the first frame of the series of frames and a current frame of the series of frames. To update the cumulative optical flow map, the optical flow map engine 106 can sum incremental optical flow vectors between the current frame and the previous frame with corresponding optical flow vectors of the cumulative optical flow map.

The optical flow map 108 output by the optical flow map engine 106 can be used for various purposes and/or tasks. For example, as mentioned above, optical flow maps may be utilized in applications or systems including computer vision systems, XR systems, data compression, image segmentation, autonomous vehicle operation, among other applications.

Figure 2A:
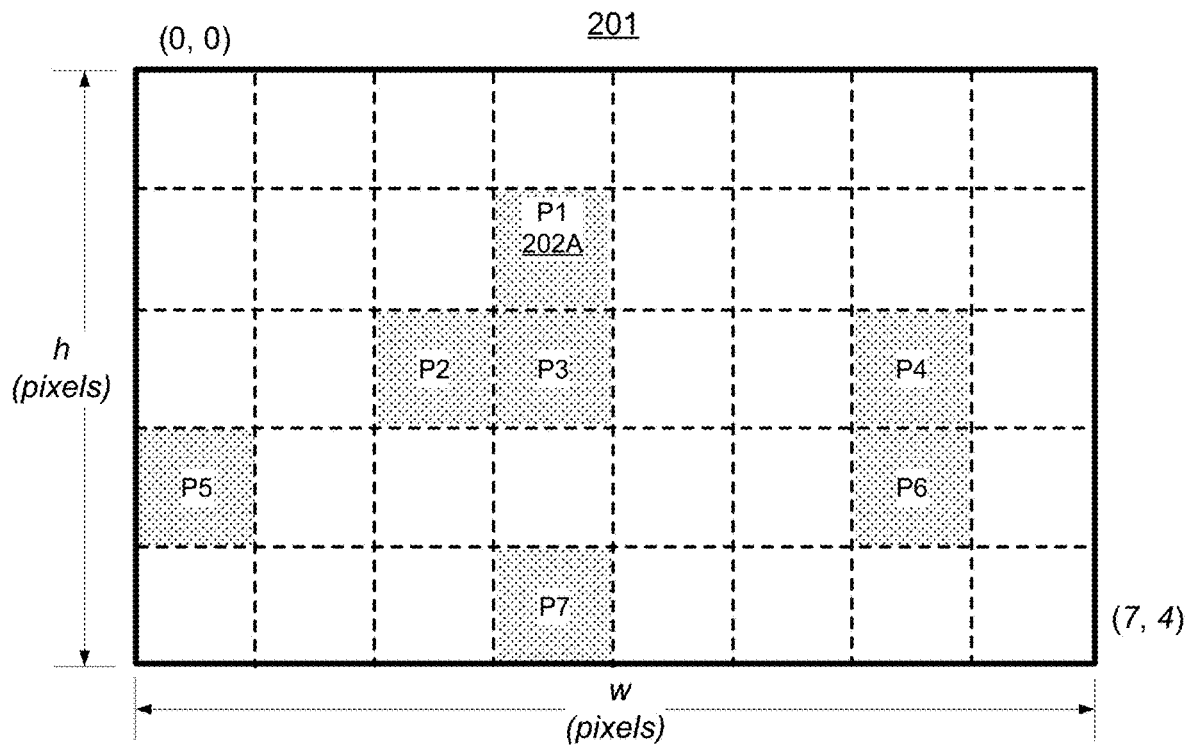
FIG. 2A is an illustration of a mask, in accordance with some examples.
Figure 2B:
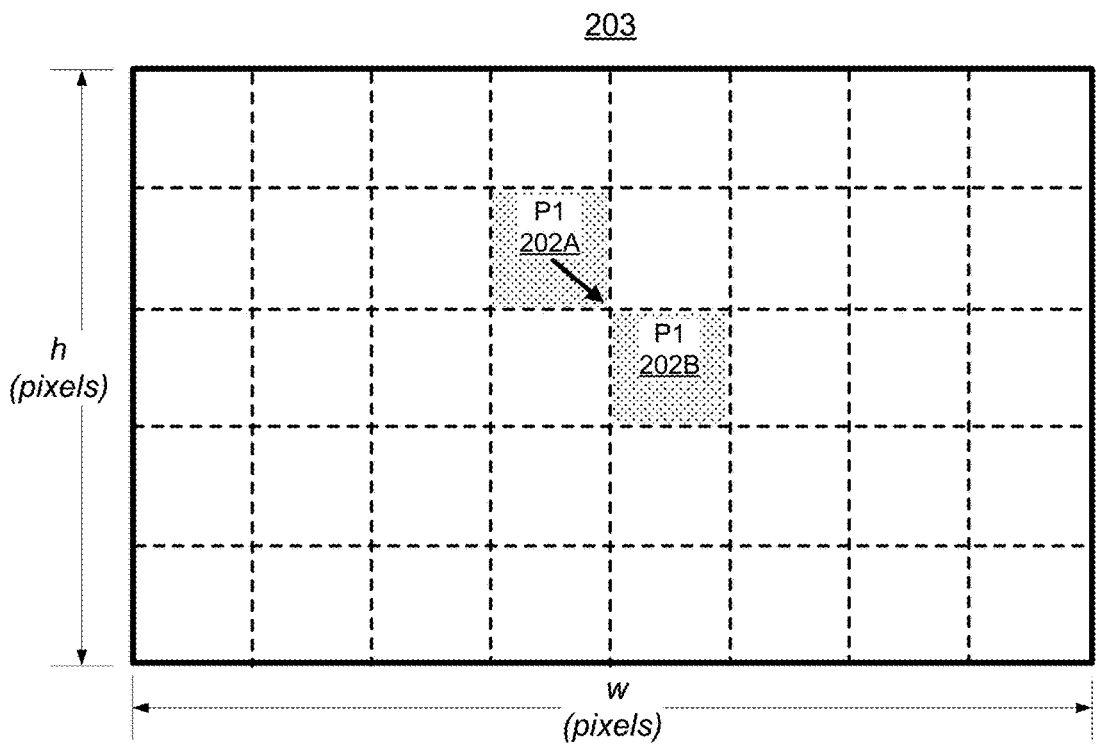
FIG. 2B is an illustration of optical flow estimation for a pixel within a mask, in accordance with some examples.

FIG. 2A and FIG. 2B are diagrams illustrating an example of the optical flow estimation process that may be performed by the optical flow estimation system 100 of FIG. 1. FIG. 2A illustrates an example of a first frame 201 of a sequence of frames. The frame 201 can correspond to one of frames 103 of FIG. 1. The frame 201 is shown with dimensions of w pixels wide by h pixels high (denoted as w×h). One of ordinary skill will understand that the frame 201 can include many more pixel locations than those illustrated in FIG. 2A. For example, the frame 201 can include a 4K (or ultra-high definition (UHD)) frame at a resolution of 3,840×2,160 pixels, an HD frame at a resolution of 1,920×1,080 pixels, or any other suitable frame having another resolution. Frame 201 includes pixels P1, P2, P3, P4, P5, P6, and P7. As shown, pixel P1 has a location 202A. The pixel location 202A can include a (w, h) pixel location of (3, 1) relative to the top-left-most pixel location of (0, 0).

In one example, the pixels P1-P7 are selected to be included within a mask. As shown in FIG. 2A, pixels within a mask can be adjacent to each other (e.g., touching), or the pixels can be isolated and/or separated from each other. For instance, a moving object may correspond to a region of pixels within a frame. However, the disclosed sparse optical flow estimation systems may be capable of performing optical flow estimation for the object without determining optical flow vectors for each pixel within the region. In some cases, a small number of pixels (e.g., 1 pixel, 3 pixels, etc.) may be sufficient for accurate optical flow estimation of a larger region. In an illustrative example, pixels P1, P2, and P3 may correspond to the tip of a person's nose, and pixel P5 may correspond to a boundary between the person's face and the background of the frame.

FIG. 2B is a diagram illustrating an example of a second frame 203 of the sequence of frames. The second frame 203 has the same corresponding pixel locations as that of the first frame 201 (with dimension w×h), such as the top-left pixel (at pixel position or location (0, 0)) in the frame 201 corresponding to the top-left pixel (at pixel position or location (0, 0)) in the second frame 203. As shown, the pixel P1 has moved from the pixel location 202A in the frame 201 to an updated pixel location 202B in the frame 203. The updated pixel location 202B can include a (w, h) pixel location of (4, 2) relative to the top-left-most pixel location of (0, 0). An optical flow vector can be computed for the pixel P1, indicating the velocity or optical flow of the pixel P1 from the first frame 201 to the second frame 203. In one illustrative example, the optical flow vector for the pixel P1 between the frames 201 and 203 is (1, 1), indicating the pixel P1 has moved one pixel location to the right and one pixel location down. In some cases, the optical flow estimation system 100 can determine optical flow vectors for the remaining pixels P2-P7 of the mask in a similar manner (while not determining optical flow vectors for pixels not included within the mask).

Figure 3:
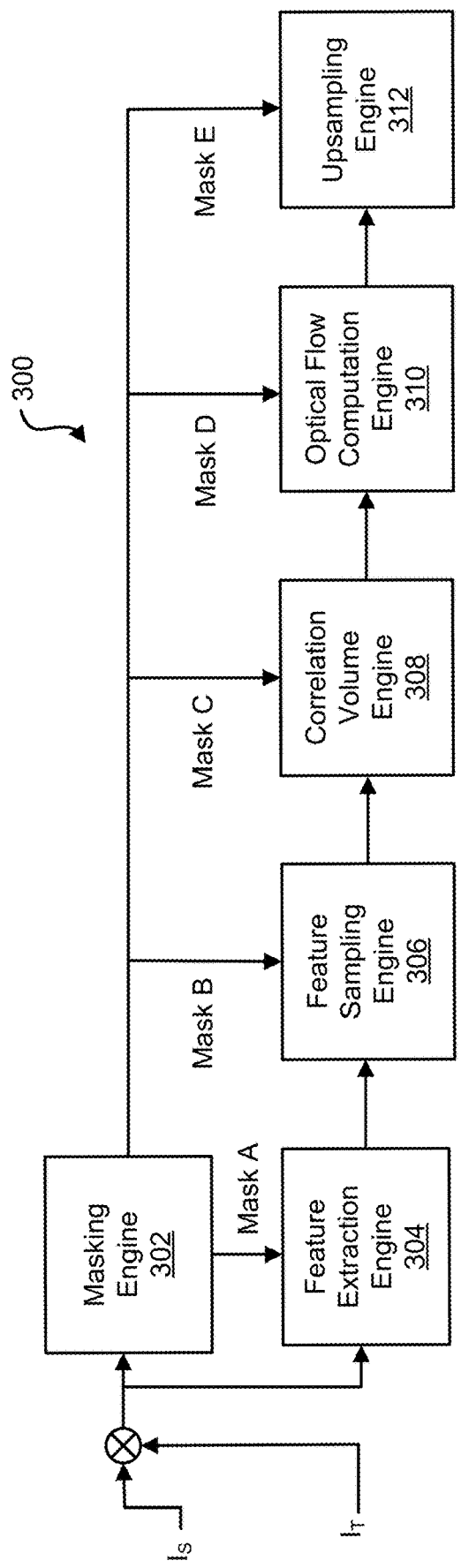
FIG. 3 is a block diagram illustrating an example optical flow estimation system, in accordance with some examples.

FIG. 3 is a diagram illustrating an example of an optical flow estimation system 300. In some cases, all or a portion of the optical flow estimation system 300 can correspond to and/or be included within the optical flow estimation system 100 of FIG. 1. For example, the engines of the optical flow estimation system 300 (e.g., a masking engine 302, a feature extraction engine 304, a feature sampling engine 306, a correlation volume engine 308, an optical flow computation engine 310, and an upsampling engine 312) may be configured to perform all or a portion of the functions performed by the engines of the optical flow estimation system 100 and/or and any additional functions. As will be explained in more detail below, the optical flow estimation system 300 can perform functions optimized for sparse optical flow estimation.

As shown in FIG. 3, the optical flow estimation system 300 can receive a source frame $I_S$ and a target frame $I_T$. In one example, the source frame $I_S$ represents a frame received prior to the target frame $I_T$. For example, the source frame $I_S$ may be directly adjacent to the target frame $I_T$ within a sequence of frames. The source frame $I_S$ and the target frame $I_T$ can be input to the masking engine 302 and/or the feature extraction engine 304. As shown in FIG. 3, the source frame $I_S$ and the target frame $I_T$ can be concatenated or otherwise combined before being passed to the masking engine 302 and/or the feature extraction engine 304.

The masking engine 302 can perform mask generation to facilitate pixel and/or frame selection. For example, the masking engine 302 can generate one or more masks (shown in FIG. 3 as mask A, mask B, mask C, mask D, and mask E). The optical flow estimation system 300 can apply the one or more masks to one or multiple blocks along the overall flow estimation model of the optical flow estimation system 300 shown in FIG. 3. For instance, in some cases, the masks A-E can all be used in the various blocks (e.g., Mask A used by the feature extraction engine 304, Mask B used by the feature sampling engine 306, Mask C used by the correlation volume engine 308, Mask D used by the optical flow computation engine 310, and Mask E used by the upsampling engine 312). In some cases, only a subset of masks A-E can be used by one or more of the blocks (e.g., only Mask A is used by the feature extraction engine 304).

In some examples, the one or more masks can spatially indicate discrete points or one or more regions of consecutive points as a subset from all points in the source frame $I_S$ and/or the target frame $I_T$. In some examples, the one or more masks can temporally indicate multiple levels of frames in association with multiple levels of computation. In some cases, spatial examples of the masked pixels can include association with object boundaries, smoothness, discontinuities, confidence, and/or information. Temporal examples of the masked frames can include a level of the frames in terms of their significance in motion and/or contents, etc. In some cases, masking may also be performed using dynamic programming (as described above), with which the selection by significance and/or relevancy to the overall flow estimation may be derived or predicted.

In some cases, to support sparse and/or multi-level (in significance) flow estimation, the feature extraction engine 304 can perform feature extraction that, for each applicable pixel p (e.g., identified by the mask A), extracts not only features of p, but also information that is relevant to p in terms of the spatial and/or temporal relevancy and (expected) contributions. The relevant information can be obtained from information (e.g., features) associated with neighboring pixels around or adjacent to the pixel p, or even non-local pixels in relation to the pixel p, as described below. The relevant information may also include certain spatial and/or temporal contextual information in relation to a pixel p. Such types of information in relation to each instance of a pixel p can be fused for each pixel p. A goal of the feature extraction engine 304 is to, for each applicable p, extract and collect as much information (e.g., features) as needed that would be utilized in subsequent stages of processing. For example, for each applicable pixel p, the feature extraction engine 304 may extract and collect features and fuse them, as described below.

For instance, the feature extraction engine 304 can determine contextual features associated with the pixels of the source frame $I_S$ and/or the target frame $I_T$. In one example, contextual features associated with a pixel can include feature vectors extracted from a frame using a machine learning system and/or algorithm. An example of a machine learning system and/or algorithm that can be used is a deep neural network trained for feature extraction. Illustrative examples of deep neural networks are described below with respect to FIG. 6 and FIG. 7. The feature vectors can indicate features such as a label or classification of the pixel, visual properties and/or characteristics of the pixel, semantic features of the pixel, among other features. In some cases, the feature vectors can include information relevant to spatial characteristics of a pixel. The spatial characteristics can include associations of the pixel with object boundaries, a smoothness of the pixel, discontinuities associated with the pixel, among other characteristics. In some cases, the spatial characteristics can include a spatial confidence associated with the significance and/or relevance of the pixel to overall optical flow estimation. For example, a pixel with a high spatial confidence may be highly significant and/or relevant (e.g., a high amount of movement) to optical flow estimation. In some cases, the feature vectors can include information relevant to temporal characteristics of the pixel. In some cases, the temporal characteristics of the pixel can include one or more characteristics associated with the motion of the pixel, including the velocity of the motion, the acceleration of the motion, among other characteristics. In one example, the temporal characteristics can include a confidence associated with the significance and/or relevance of the motion of the pixel to overall optical flow estimation. For example, a pixel with a high temporal confidence may be highly significant and/or relevant to optical flow estimation.

In some cases, the feature extraction engine 304 can determine multi-scale contextual features associated with a frame. Multi-scale contextual features can include features associated with a frame at various scales (e.g., resolutions). For example, the feature extraction engine 304 can determine contextual features associated with a high-scale (e.g., full resolution) version of a frame. Additionally or alternatively, the feature extraction engine 304 can determine contextual features associated with one or more lower-scale (e.g., reduced resolution) versions of a frame. In some cases, contextual features associated with different scales can be utilized at different steps of the optical flow estimation process. For example, utilizing low-scale feature vectors can improve the efficiency of some optical flow estimation steps, while utilizing high-scale feature vectors can improve the quality and/or accuracy of other optical flow estimation steps.

In some cases, contextual features associated with a pixel can include contextual features associated with pixels surrounding and/or nearby the pixel, as noted above. For instance, each pixel of a frame can represent a center pixel that is surrounded by one or more neighbor pixels. In one example, a neighbor pixel can refer to any pixel that is directly adjacent (e.g., horizontally, vertically, and/or diagonally adjacent) to the center pixel. In other examples, a neighbor pixel can refer to a pixel that is separated from the center pixel by no more than a threshold distance or number of pixels (e.g., 2 pixels, 3 pixels, etc.). In further examples, a neighbor pixel may be a pixel that has a high spatial and/or temporal association with the pixel. These pixels may be adjacent to the center pixel, or non-adjacent (e.g., non-local) to the center pixel. The feature extraction engine 304 can determine contextual features of any number of neighbor pixels associated with a center pixel. For example, the feature extraction engine 304 can extract and collect as many contextual features as needed for one or more steps of optical flow estimation processing (explained in more detail below). The feature extraction engine 304 can also associate the contextual features of the neighbor pixels with the center pixel. For example, the feature extraction engine 304 can concatenate, group, and/or otherwise store the contextual features of the neighbor pixels in connection with the contextual features of the center pixel within a data structure associated with the center pixel. The data structure can include an index corresponding to the coordinates of the center pixel. In one example, the feature extraction engine 304 can fuse contextual features associated with each relevant neighbor pixel through weighting, summation, concatenation, and/or other technique. For instance, the feature extraction engine 304 can determine the fused contextual features according to the equation $f_{p,i}$, $i \in \{0,1, \ldots, C-1\}$, $C \in R$, such that features $f_{p,i}$ are derived for pixel p.

By associating contextual features of neighbor pixels with contextual features of a center pixel, the feature extraction engine 304 can improve the accuracy of sparse optical flow estimation. For instance, by determining and storing the contextual features of neighbor pixels in connection with a center pixel, the feature extraction engine 304 can help the optical flow estimation system 300 accurately identify a pixel that corresponds to the center pixel within a subsequent frame. Because sparse optical flow estimation may not involve a 1-to-1 mapping between each pixel of an initial frame and each pixel of a subsequent frame, the contextual information associated with neighbor pixels can help the optical flow estimation system 300 accurately select a corresponding pixel from within multiple candidate pixels.

The feature extraction engine 304 can determine contextual features for all or a portion of the pixels of the source frame $I_S$ and the target frame $I_T$. In one example, the feature extraction engine 304 can determine contextual features of pixels of the source frame $I_S$ and the target frame $I_T$ corresponding to a mask (e.g., mask A provided by the masking engine 302). For instance, the feature extraction engine 304 can apply mask A to determine which pixels from the source frame $I_S$ to process for extracting contextual features and/or which pixels from the target frame $I_T$ to process for extracting contextual features. For example, the feature extraction engine 304 can determine contextual features for only pixels identified by the mask A. In some cases, the pixels identified by the mask A may be selected based at least in part on a machine learning algorithm trained to extract important and/or key features.

In some cases, the feature sampling engine 306 can receive features (e.g., represented by one or more feature vectors) extracted by the feature extraction engine 304. The feature sampling engine 306 can perform the operation of sampling and/or re-grouping of the sampled points of the features. For example, the feature sampling engine 306 can retrieve and/or group feature vectors (or sample points of features in the feature vectors) to facilitate subsequent stages of processing. In some cases, the feature sampling engine 306 can sample the feature vectors in accordance with a mask (e.g., mask B). For instance, the feature sampling engine 306 can apply the Mask B such that only the subset of pixels marked by the Mask B is designated as relevant for further computation. In such an example, regions and/or pixels not marked by the Mask B may be ignored. In some cases, mask B may be similar to or the same as mask A. In other cases, mask B may be configured to be different than mask A. For example, mask B may identify a different subset of pixels as compared to mask A.

The correlation volume engine 308 can receive the sampled feature vectors from the feature sampling engine 306. The correlation volume engine 308 can perform correlation volume computation on the sampled feature vectors. For instance, using the output of sampled feature maps from both input frames (the source frame $I_S$ the target frame $I_T$) as input, the correlation volume engine 308 can compute pair-wise correlation in a number of pair combinations (e.g., for all possible pair combinations). Each correlation quantity denotes the correlation or in some cases the similarity between two features, one from each frame (e.g., one feature from the source frame $I_S$ and one feature from the target frame $I_T$). The correlation volume determined by the correlation volume engine 308 can be used as the input to subsequent optical flow estimation (e.g., by the optical flow computation engine 310). In one illustrative example, the pixel collections (e.g., tensors including the data) according to masks $M_s$ and $M_t$ can have a dimension or shape of $H_s W_s C$ and $H_t W_t C$, respectively, where mask $M_s$ is a mask generated for the source frame $I_S$ by the masking engine 302, $M_t$ is a mask generated for the target frame $I_T$ by the masking engine 302, H denotes height, W denotes width, and C denotes a number of channels (or depth in some cases) in a neural network used for the masking engine 302. In some examples, the correlation volume engine 308 can compute the correlation volume using the following equation: $f_s \cdot f_t = \sum_{i=0}^{C-1} f_{s,i} f_{t,i}$, where $f_s$, $f_t \in R^C$ are features of individual pixels in the pixel collections for the source frame $I_S$ and the target frame $I_T$, respectively. In some cases, the correlation volume engine 308 can process the feature vectors in accordance with an optical flow mask (e.g., mask C). For instance, the correlation volume engine can select or determine only correlations marked by the mask C (in which case the remaining correlations not marked by the mask C are discarded). In some cases, mask C may be similar to or the same as mask A and/or mask B. In other cases, mask C may be configured to be different than mask A and/or mask B.

The optical flow computation engine 310 can receive the correlation volume computation from the correlation volume engine 308. The optical flow computation engine 310 can use the features in the correlation volume computation to perform pointwise (e.g., pixel-wise) optical flow estimations for the pixels identified in the mask (e.g., mask A, mask D, or other mask). In some cases, the optical flow computation engine 310 can use one or more neural network operations (e.g., one or more layers of convolutions, one or more residual blocks of convolutions, and/or other network operations) to refine and/or adjust the optical flow estimations. For example, the optical flow computation engine 310 can determine optical flow estimations for particular feature vectors in accordance with one or more masks (e.g., mask D). In one example, the optical flow computation engine 310 can perform optical flow estimation to determine optical flow vectors for pixels or regions of pixels identified by the mask D. In some cases, mask D may be similar to or the same as mask A, B, and/or mask C. In other cases, mask D may be configured to be different than mask A, B, and/or mask C. In some examples, the features corresponding to the source frame $I_S$ and the target frame $I_T$ can have a same resolution as the source frame $I_S$ and the target frame $I_T$.

The upsampling engine 312 can receive the optical flow estimations from the optical flow computation engine 310. The upsampling engine 312 can perform one or more upsampling operations on the optical flow estimations in order to increase resolution of estimated optical flow fields. In some cases, the upsampling engine 312 can select a particular upsampling operation based on the pixel format and/or distribution within the mask(s) used for optical flow estimation. For example, the upsampling engine 312 can perform a first upsampling operation for masks including regions of consecutive pixels, a second upsampling operation for masks including discrete (e.g., non-consecutive) pixels, a third upsampling operation for masks including every (or approximately ever) pixel within a frame, and/or any other upsampling operation.

As mentioned above, the feature extraction engine 304 can determine multi-scale contextual features associated with pixels of a frame. In some cases, various steps of the optical flow estimation process can utilize contextual features of different scales. For example, the optical flow computation engine 310 can utilize extracted features in the form of a feature pyramid of multiple scales, of concatenated and/or fused features with one or multiple scales, or other combinations of features. In some examples, the optical flow computation engine 310 can select a mask for a particular step based on the scale of the contextual features used at the step. For instance, a mask with a low resolution may be used in conjunction with feature vectors of low resolution. Additionally or alternatively, the optical flow computation engine 310 can select a mask for a particular step based on the operation(s) performed at the step. For instance, feature sampling performed by the feature sampling engine 306 may be optimized using a first mask, while correlation volume computations determined by the correlation volume engine 308 may be optimized using a second mask. As such, in some cases, mask A, mask B, mask C, mask D, and/or mask E illustrated in FIG. 3 can include variations and/or discrepancies. However, two or more of the masks can be the same or similar. Further, a step within the optical flow estimation process can utilize multiple masks, or no masks.

By determining a subset of pixels corresponding to key features within a frame, the disclosed optical flow estimation techniques and systems can optimize sparse optical flow estimation based on the spatial characteristics of the frame. In some cases, the disclosed techniques and systems can optimize sparse optical flow estimation based on the temporal characteristics of a series of frames. For example, as mentioned above, the optical flow estimation system 300 can determine optical flow estimations between two directly adjacent frames and/or between two frames separated by one or more intermediate frames. In some cases, the optical flow estimation system 300 can selectively perform optical flow estimation for particular frames. For instance, the optical flow estimation system 300 can determine an importance value of all or a portion of the frames within a series of frames. Frames with importance values that meet or exceed (are greater than) a threshold importance value can be designated as key frames for which optical flow estimation is to be performed. In some cases, the optical flow estimation system 300 can determine the importance of a frame based on the features within the frame. For example, a frame with a high number of important features (e.g., key features) may have a high importance value. In another example, a frame with relatively low motion relative to a previous frame may have a low importance value. The disclosed optical flow estimation systems can optimize sparse optical flow estimation for any combination of spatial and/or temporal characteristics of one or more frames.

The systems and techniques described provide masking to identify regions for sparse optical flow estimation, as opposed to performing dense homogeneous estimation. For instance, regions that involve no motion (e.g., an image background from a still camera) can be skipped when performing optical flow estimation, resulting in a reduction in computation costs with higher estimation accuracy. Such a solution can benefit many different fields, such as adaptive regional video source compression as one illustrative example. In some cases, selected regions or pixels that may need more sophisticated optical flow estimation can be determined or recognized using smart masking for flow refinement. For instance, the smart masking can include a deep learning neural network based approach to determine the one or more masks. In one illustrative example, a smart masking engine (e.g., the masking engine 302) can determine the one or more masks based on the input features (or frames), the content of the features and/or frames, activities associated with the of the features and/or frames, semantics associated with the features and/or frames, consistency, among other factors. As described herein, the masks can be used to assist in subsequent stages of optical flow processing (e.g., by one or more of the blocks or engines of the optical flow estimation system 300). As described above, the masking for region or frame selection may be made in the spatial and/or the temporal dimension, affecting percentages of content or levels of resolution for refinement. In some cases, a flow network design strategy can fuse multi-scale and contextual features in a front part of a neural network, can prepare a correlation volume at a middle-part of the network, and can then allocate refinement in the later or back part of the network, as shown in FIG. 3.

Figure 4A:
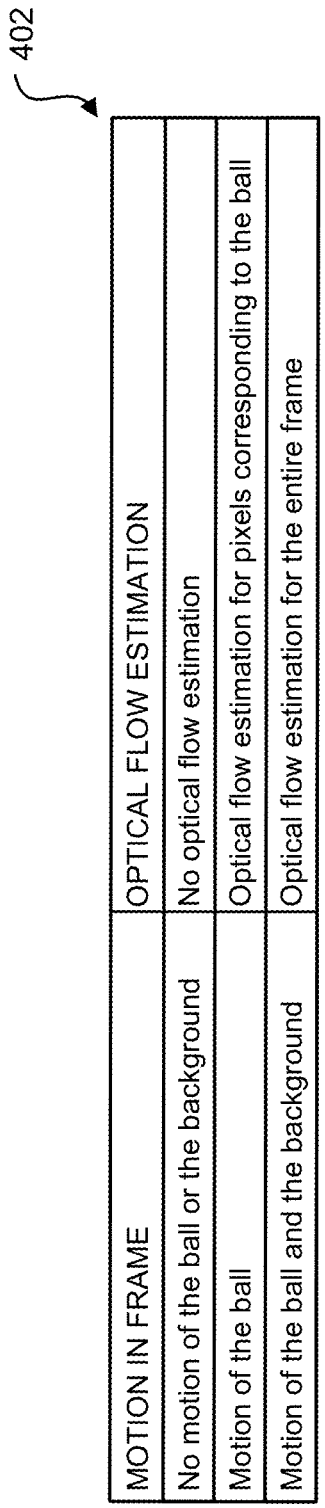
FIG. 4A and FIG. 4B are tables illustrating variations in optical flow estimation sparsity, in accordance with some examples.
Figure 4B:
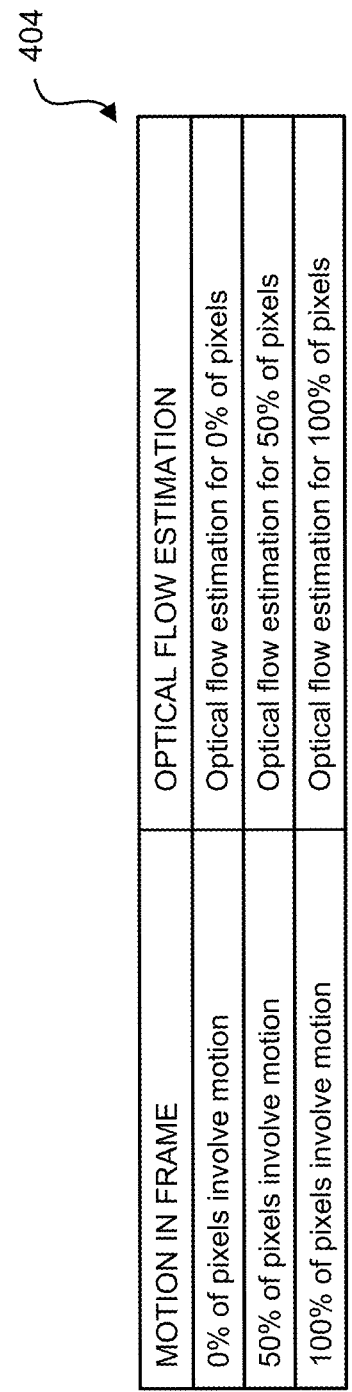

FIG. 4A and FIG. 4B illustrate examples of optimizing and/or adjusting the sparsity of optical flow estimation data based on the amount of motion associated with one or more frames. For example, FIG. 4A illustrates a table 402 that indicates areas of a frame for which optical flow estimation is to be performed based on motion within the frame. In this example, the frame includes a ball in the foreground and a background behind the ball. When the ball is not in motion and there is no motion in the background, the optical flow estimation system 100 performs no optical flow estimation for the frame. When the ball is in motion, the optical flow estimation system 100 can perform optical flow estimation for pixels corresponding to the ball. When the ball is in motion and there is motion in the background, the optical flow estimation system 100 can perform optical flow for the entire frame (or for a large portion of the frame, such as 80%, 90%, etc.).

FIG. 4B illustrates a table 404 that indicates percentages of pixels within a frame for which optical flow estimation is to be performed based on motion within the frame. As shown in FIG. 4A and FIG. 4B, the size and/or location of the masks implemented by the disclosed optical flow estimation systems can be dynamically adjusted and/or optimized based on current and/or detected level of motions within received frames. For instance, when the ball is not in motion and there is no motion in the background (according to the first row of FIG. 4A), the optical flow estimation system 100 performs optical flow estimation for 0% of the frame. When the ball is in motion, the optical flow estimation system 100 can perform optical flow estimation for 50% of the pixels (which correspond to the ball). When the ball is in motion and there is motion in the background, the optical flow estimation system 100 can perform optical flow for 100% of the frame in one example.

Figure 5:
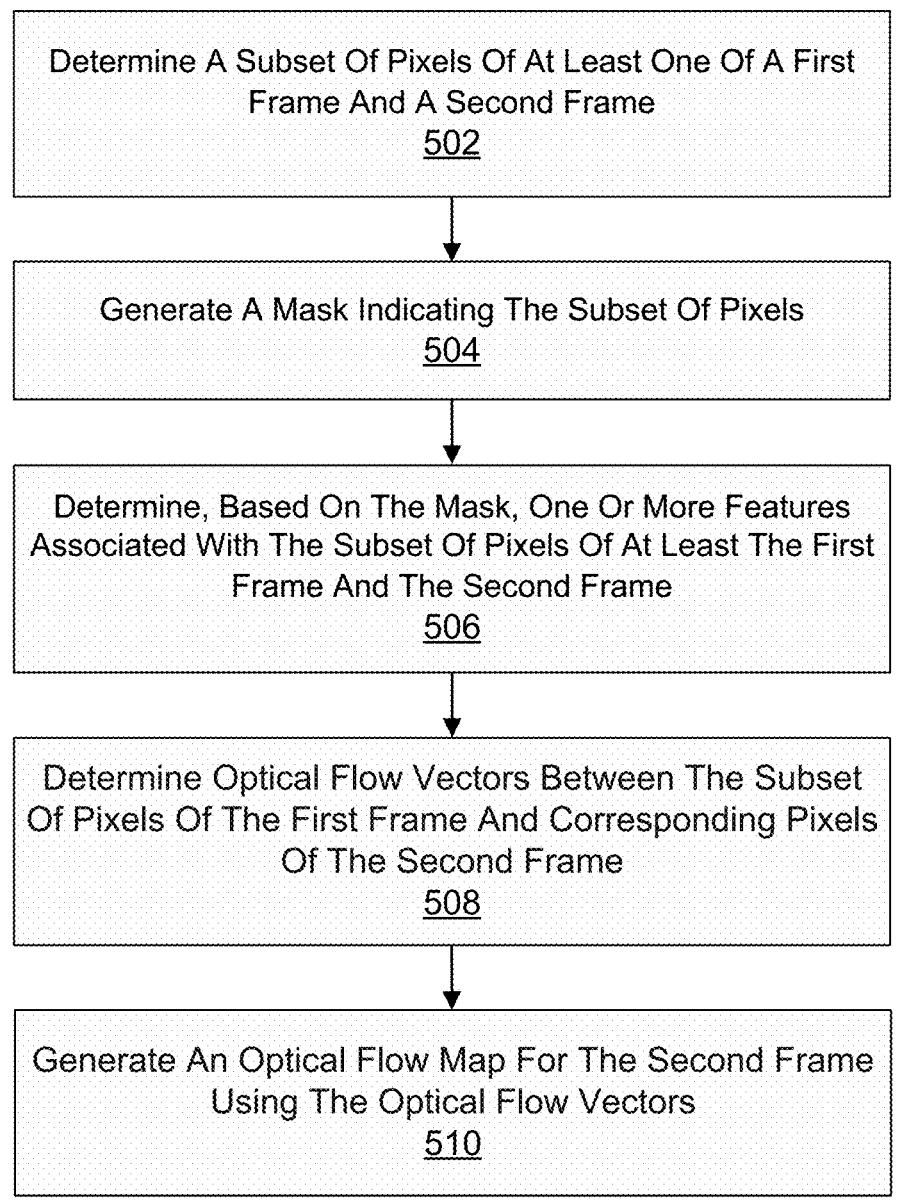
FIG. 5 is a flow diagram illustrating an example of a process for performing sparse optical flow estimation, in accordance with some examples.

FIG. 5 is a flowchart illustrating an example of a process 500 of optical flow estimation between one or more frames using one or more of the techniques described herein. At block 502, the process 500 includes determining a subset of pixels of at least one of a first frame and a second frame. At block 504, the process 500 includes generating a mask indicating the subset of pixels. In some examples, the process 500 can include determining the subset of pixels of at least the first frame and the second frame using a machine learning algorithm. For example, the optical flow estimation system 300 can include a machine learning system and/or algorithm that can determine the subset of pixels (e.g., using the masking engine 302).

In some examples, the process 500 can include identifying a first pixel of the first frame corresponding to a first region of interest and identifying a second pixel of the first frame corresponding to a second region of interest. In some examples, the first region of interest and/or the second region of interest can be or can include one or more objects (e.g., a car or other vehicle, a person, a building, etc.), a part of an object (e.g., the wheels of a car, an arm or hand of a person, a sign on a building, etc.), and/or other portion of a scene depicted in the first frame. In some examples, the first region of interest may include a moving region of interest (e.g., a moving object), and the second region of interest may include a stationary object. In some examples, the first region of interest may include an object of interest (e.g., hands of a user, regardless of whether the hands are moving or not in the first frame), and the second region of interest may include a portion of the scene that is not of interest (e.g., a background of a scene, etc.). In some examples, the process 500 can include the first pixel (corresponding to the first region of interest) within the subset of pixels and excluding (not including) the second pixel (corresponding to the second region of interest) from the subset of pixels.

In some examples, the process 500 can include determining the subset of pixels of at least the first frame and the second frame by identifying at least one pixel corresponding to a boundary between two objects. For example, pixels along the boundary can be included in the subset of pixels.

In some examples, the process 500 can include determining the subset of pixels of at least the first frame and the second frame by sampling a predetermined number of pixels within the first frame.

At block 506, the process 500 includes determining, based on the mask, one or more features associated with the subset of pixels of at least the first frame and the second frame. In some examples, the subset of pixels of at least the first frame and the second frame includes at least one pixel with adjacent pixels that are not included in the subset of pixels. In such examples, the process 500 can include determining, based on the mask, the one or more features by determining feature information corresponding to the adjacent pixels of the at least one pixel, and storing the feature information corresponding to the adjacent pixels in association with the at least one pixel. In some examples, the process 500 can include determining an optical flow vector between the at least one pixel and a corresponding pixel of the second frame using the feature information corresponding to the adjacent pixels.

At block 508, the process 500 includes determining optical flow vectors between the subset of pixels of the first frame and corresponding pixels of the second frame. At block 510, the process 500 includes generating an optical flow map for the second frame using the optical flow vectors.

In some examples, the process 500 includes determining importance values for frames within a sequence of frames including the first frame and the second frame. The process 500 can include selecting a frame within the sequence of frames for performing optical flow estimation based on the importance values. In some cases, process 500 includes selecting the second frame for performing optical flow estimation based on determining an importance value of the second frame exceeds (or is greater than) a threshold importance value.

Figure 8:
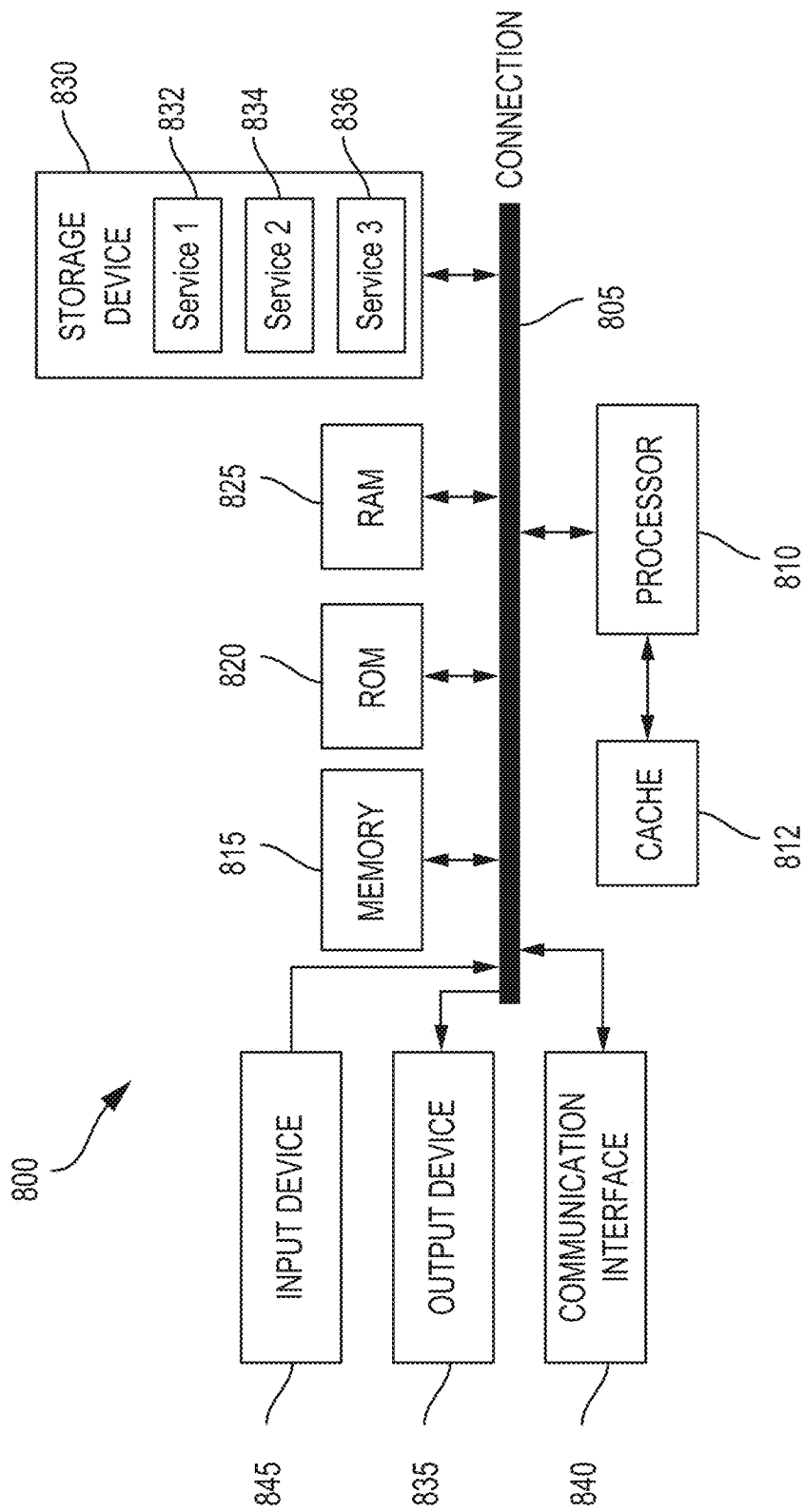
FIG. 8 is a diagram illustrating an example of a system for implementing certain aspects described herein.

In some examples, the processes described herein (e.g., process 500 and/or other process described herein) may be performed by a computing device or apparatus, such as a computing device having the computing device architecture 800 shown in FIG. 8. In one example, the process 500 can be performed by a computing device with the computing device architecture 800 implementing the optical flow estimation system 300 shown in FIG. 3. In some examples, the computing device can include a mobile device (e.g., a mobile phone, a tablet computing device, etc.), a wearable device, an extended reality (XR) device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 500 and/or other process described herein.

In some cases, the computing device or apparatus may include various components, such as one or more input devices, one or more output devices, one or more processors (e.g., a general purpose processor, a neural processing unit (NPU), a digital signal processor (DSP), a graphics processor, and/or other processor), one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 500 and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, the optical flow estimation systems and techniques described herein can be implemented using a neural network-based machine learning system. Illustrative examples of neural networks that can be used include one or more convolutional neural networks (CNNs), auto-encoders, deep belief nets (DBNs), Recurrent Neural Networks (RNNs), Generative Adversarial Networks (GANs), Gated Recurrent Unit (GRUs), any combination thereof, and/or any other suitable neural network.

Figure 6:
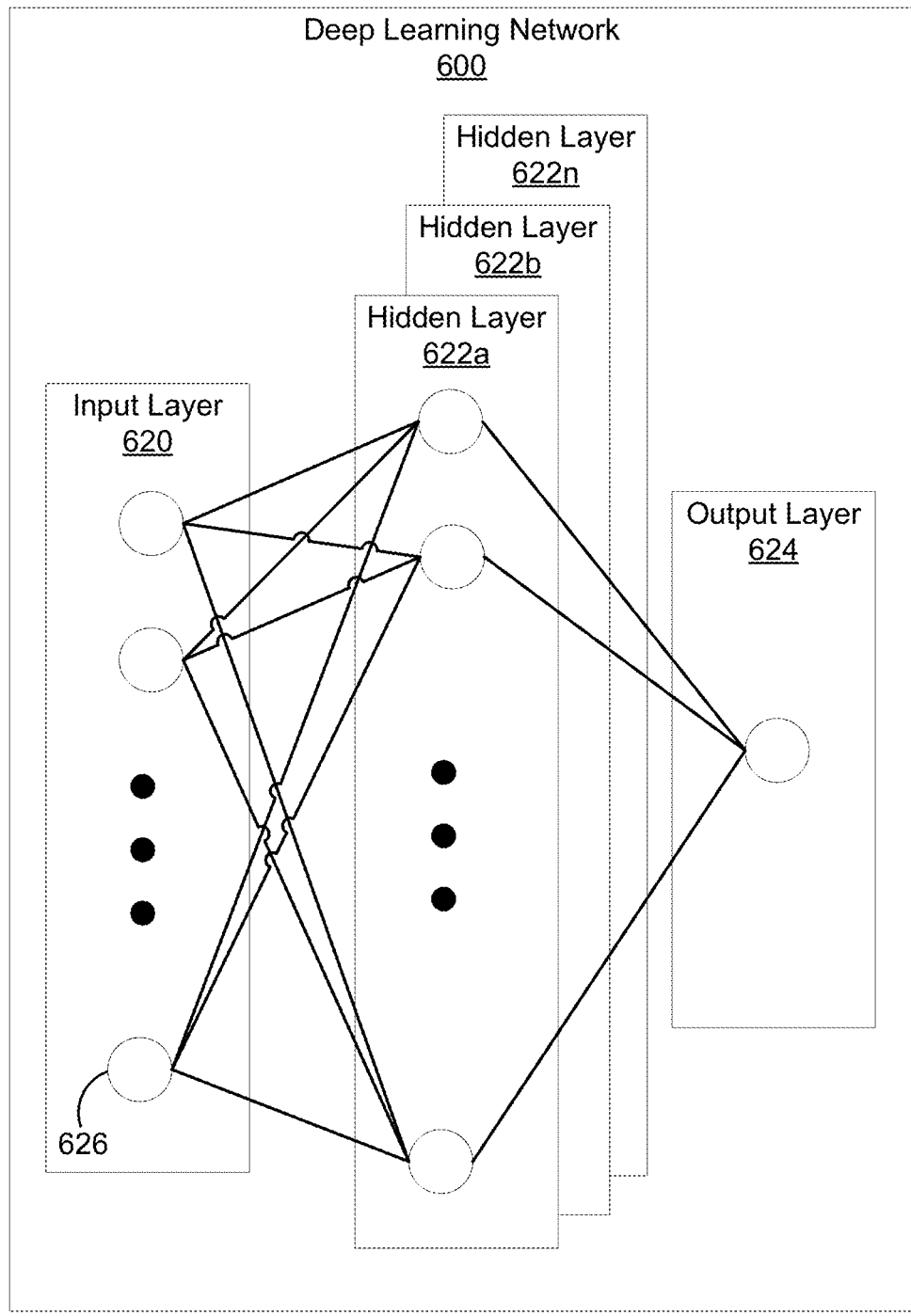
FIG. 6 is a diagram illustrating an example of deep learning neural network, in accordance with some examples.

FIG. 6 is an illustrative example of a deep learning neural network 600 that can be used by an object detector. An input layer 620 includes input data. In one illustrative example, the input layer 620 can include data representing the pixels of an input video frame. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 624 that provides an output resulting from the processing performed by the hidden layers 622a, 622b, through 622n. In one illustrative example, the output layer 624 can provide a classification for an object in an input video frame. The classification can include a class identifying the type of object (e.g., a person, a dog, a cat, or other object).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the hidden layers 622a, 622b, through 622n can transform the information of each input node by applying activation functions to these information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 624, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 624. In an example in which the neural network 600 is used to identify objects in images, the neural network 600 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 600 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in images, the forward pass can include passing a training image through the neural network 600. The weights are initially randomized before the neural network 600 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
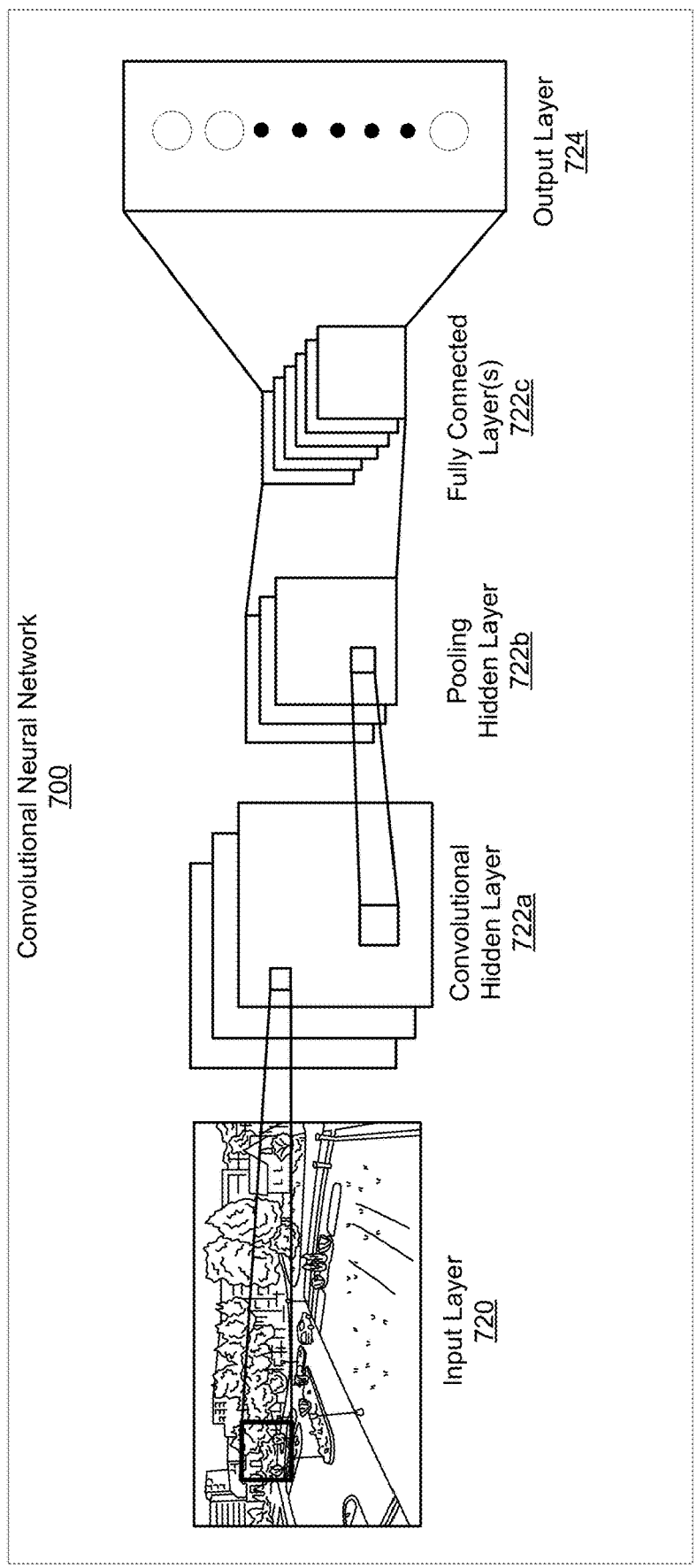
FIG. 7 is a diagram illustrating an example of a convolutional neural network, in accordance with some examples.

FIG. 7 is an illustrative example of a convolutional neural network 700 (CNN 700). The input layer 720 of the CNN 700 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722a, an optional non-linear activation layer, a pooling hidden layer 722b, and fully connected hidden layers 722c to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722a. The convolutional hidden layer 722a analyzes the image data of the input layer 720. Each node of the convolutional hidden layer 722a is connected to a region of nodes (pixels) of the input image called a receptive field. The convolutional hidden layer 722a can be considered as one or more filters (each filter corresponding to a different activation or feature map), with each convolutional iteration of a filter being a node or neuron of the convolutional hidden layer 722a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722a. Each connection between a node and a receptive field for that node learns a weight and, in some cases, an overall bias such that each node learns to analyze its particular local receptive field in the input image. Each node of the hidden layer 722a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722a is due to each node of the convolutional layer being applied to its corresponding receptive field. For example, a filter of the convolutional hidden layer 722a can begin in the top-left corner of the input image array and can convolve around the input image. As noted above, each convolutional iteration of the filter can be considered a node or neuron of the convolutional hidden layer 722a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722a.

The mapping from the input layer to the convolutional hidden layer 722a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 722a can include several activation maps in order to identify multiple features in an image. The example shown in FIG. 7 includes three activation maps. Using three activation maps, the convolutional hidden layer 722a can detect three different kinds of features, with each feature being detectable across the entire image.

In some examples, a non-linear hidden layer can be applied after the convolutional hidden layer 722a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the network 700 without affecting the receptive fields of the convolutional hidden layer 722a.

The pooling hidden layer 722b can be applied after the convolutional hidden layer 722a (and after the non-linear hidden layer when used). The pooling hidden layer 722b is used to simplify the information in the output from the convolutional hidden layer 722a. For example, the pooling hidden layer 722b can take each activation map output from the convolutional hidden layer 722a and generates a condensed activation map (or feature map) using a pooling function. Max-pooling is one example of a function performed by a pooling hidden layer. Other forms of pooling functions be used by the pooling hidden layer 722a, such as average pooling, L2-norm pooling, or other suitable pooling functions. A pooling function (e.g., a max-pooling filter, an L2-norm filter, or other suitable pooling filter) is applied to each activation map included in the convolutional hidden layer 722a. In the example shown in FIG. 7, three pooling filters are used for the three activation maps in the convolutional hidden layer 722a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 722a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722a having a dimension of 24×24 nodes, the output from the pooling hidden layer 722b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722b to every one of the output nodes in the output layer 724. Using the example above, the input layer includes 28×28 nodes encoding the pixel intensities of the input image, the convolutional hidden layer 722a includes 3×24×24 hidden feature nodes based on application of a 5×5 local receptive field (for the filters) to three activation maps, and the pooling layer 722b includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722b is connected to every node of the output layer 724.

The fully connected layer 722c can obtain the output of the previous pooling layer 722b (which should represent the activation maps of high-level features) and determines the features that most correlate to a particular class. For example, the fully connected layer 722c layer can determine the high-level features that most strongly correlate to a particular class, and can include weights (nodes) for the high-level features. A product can be computed between the weights of the fully connected layer 722c and the pooling hidden layer 722b to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1: An apparatus for optical flow estimation between one or more frames.

The apparatus includes a memory configured to store data corresponding to the one or more frames and a processor configured to: determine a subset of pixels of at least one of a first frame and a second frame; generate a mask indicating the subset of pixels; determine, based on the mask, one or more features associated with the subset of pixels of at least the first frame and the second frame; determine optical flow vectors between the subset of pixels of the first frame and corresponding pixels of the second frame; and generate an optical flow map for the second frame using the optical flow vectors.

Example 2: The apparatus of example 1, wherein the processor is configured to determine the subset of pixels of at least the first frame and the second frame using a machine learning algorithm.

Example 3: The apparatus of any of examples 1 or 2, wherein the processor is configured to determine the subset of pixels of at least the first frame and the second frame by: identifying a first pixel of the first frame corresponding to a first region of interest; identifying a second pixel of the first frame corresponding to a second region of interest; and including the first pixel within the subset of pixels and excluding the second pixel from the subset of pixels.

Example 4: The apparatus of any of examples 1 to 3, wherein the processor is configured to determine the subset of pixels of at least the first frame and the second frame by identifying at least one pixel corresponding to a boundary between two objects.

Example 5: The apparatus of any of examples 1 to 4, wherein the processor is configured to determine the subset of pixels of at least the first frame and the second frame by sampling a predetermined number of pixels within the first frame.

Example 6: The apparatus of any of examples 1 to 5, wherein the subset of pixels of at least the first frame and the second frame includes at least one pixel with adjacent pixels that are not included in the subset of pixels.

Example 7: The apparatus of example 6, wherein the processor is configured to determine, based on the mask, the one or more features by: determining feature information corresponding to the adjacent pixels of the at least one pixel; and storing the feature information corresponding to the adjacent pixels in association with the at least one pixel.

Example 8: The apparatus of example 7, wherein the processor is configured to determine an optical flow vector between the at least one pixel and a corresponding pixel of the second frame using the feature information corresponding to the adjacent pixels.

Example 9: The apparatus of any of examples 1 to 8, wherein the processor is configured to: determine importance values for frames within a sequence of frames including the first frame and the second frame; and select a frame within the sequence of frames for performing optical flow estimation based on the importance values.

Example 10: The apparatus of example 9, wherein the processor is configured to select the second frame for performing optical flow estimation based on determining an importance value of the second frame exceeds a threshold importance value.

Example 11: The apparatus of any of examples 1 to 10, wherein the processor includes a neural processing unit (NPU).

Example 12: The apparatus of any of examples 1 to 11, wherein the apparatus comprises a mobile device.

Example 13: The apparatus of any of examples 1 to 12, wherein the apparatus comprises an extended reality device.

Example 14: The apparatus of any of examples 1 to 13, further comprising a display.

Example 15: The apparatus of any of examples 1 to 14, wherein the apparatus comprises camera configured to capture one or more frames.

Example 16: A method of optical flow estimation between one or more frames. the method includes: determining a subset of pixels of at least one of a first frame and a second frame; generating a mask indicating the subset of pixels; determining, based on the mask, one or more features associated with the subset of pixels of at least the first frame and the second frame; determining optical flow vectors between the subset of pixels of the first frame and corresponding pixels of the second frame; and generating an optical flow map for the second frame using the optical flow vectors.

Example 17: The method of example 16, further comprising determining the subset of pixels of at least the first frame and the second frame using a machine learning algorithm.

Example 18: The method of any of examples 16 to 17, wherein determining the subset of pixels of at least the first frame and the second frame includes: identifying a first pixel of the first frame corresponding to a first region of interest; identifying a second pixel of the first frame corresponding to a second region of interest; and including the first pixel within the subset of pixels and excluding the second pixel from the subset of pixels.

Example 19: The method of any of examples 16 to 18, wherein determining the subset of pixels of at least the first frame and the second frame includes identifying at least one pixel corresponding to a boundary between two objects.

Example 20: The method of any of examples 16 to 19, wherein determining the subset of pixels of at least the first frame and the second frame includes sampling a predetermined number of pixels within the first frame.

Example 21: The method of any of examples 16 to 20, wherein the subset of pixels of at least the first frame and the second frame includes at least one pixel with adjacent pixels that are not included in the subset of pixels.

Example 22: The method of example 21, wherein determining, based on the mask, the one or more features includes: determining feature information corresponding to the adjacent pixels of the at least one pixel; and storing the feature information corresponding to the adjacent pixels in association with the at least one pixel.

Example 23: The method of example 22, further comprising determining an optical flow vector between the at least one pixel and a corresponding pixel of the second frame using the feature information corresponding to the adjacent pixels.

Example 24: The method of any of examples 16 to 23, further comprising: determining importance values for frames within a sequence of frames including the first frame and the second frame; and selecting a frame within the sequence of frames for performing optical flow estimation based on the importance values.

Example 25: The method of example 24, further comprising selecting the second frame for performing optical flow estimation based on determining an importance value of the second frame exceeds a threshold importance value.

Example 26: A computer-readable storage medium storing instructions that, when executed, cause one or more processors to perform any of the operations according to any one of examples 16 to 25.

Example 27: An apparatus comprising means for performing any of the operations of examples 16 to 25.

What is claimed is:

1. An apparatus for optical flow estimation between one or more frames, comprising:
   a memory configured to store data corresponding to the one or more frames; and
   one or more processors configured to:
   determine a subset of pixels of at least one of a first frame and a second frame, wherein determining the subset of pixels comprises identifying a first pixel of the first frame corresponding to a first region of interest, identifying a second pixel of the first frame corresponding to a second region of interest, and including the first pixel within the subset of pixels and excluding the second pixel from the subset of pixels;
   generate a mask indicating the subset of pixels;
   determine, based on the mask, one or more features associated with the subset of pixels of at least the first frame and the second frame;
   determine optical flow vectors between the subset of pixels of the first frame and corresponding pixels of the second frame; and
   generate an optical flow map for the second frame using the optical flow vectors.

2. The apparatus of claim 1, wherein the one or more processors are configured to determine the subset of pixels of at least the first frame and the second frame using a machine learning algorithm.

3. The apparatus of claim 1, wherein, to determine the subset of pixels of at least the first frame and the second frame, the one or more processors are configured to identify at least one pixel corresponding to a boundary between two objects.

4. The apparatus of claim 1, wherein, to determine the subset of pixels of at least the first frame and the second frame, the one or more processors are configured to sample a predetermined number of pixels within the first frame.

5. The apparatus of claim 1, wherein the subset of pixels of at least the first frame and the second frame includes at least one pixel with adjacent pixels that are not included in the subset of pixels.

6. The apparatus of claim 5, wherein, to determine, the one or more features based on the mask, the one or more processors are configured to:
   determine feature information corresponding to the adjacent pixels of the at least one pixel; and
   store the feature information corresponding to the adjacent pixels in association with the at least one pixel.

7. The apparatus of claim 6, wherein the one or more processors are configured to determine an optical flow vector between the at least one pixel and a corresponding pixel of the second frame using the feature information corresponding to the adjacent pixels.

8. The apparatus of claim 1, wherein the one or more processors are configured to:
determine importance values for frames within a sequence of frames including the first frame and the second frame; and
select a frame within the sequence of frames for performing optical flow estimation based on the importance values.

9. The apparatus of claim 8, wherein the one or more processors are configured to select the second frame for performing optical flow estimation based on determining an importance value of the second frame exceeds a threshold importance value.

10. The apparatus of claim 1, wherein the one or more processors include a neural processing unit (NPU).

11. The apparatus of claim 1, wherein the apparatus comprises a mobile device.

12. The apparatus of claim 1, wherein the apparatus comprises an extended reality device.

13. The apparatus of claim 1, further comprising a display.

14. The apparatus of claim 1, wherein the apparatus comprises camera configured to capture one or more frames.

15. A method of optical flow estimation between one or more frames, the method comprising:
determining a subset of pixels of at least one of a first frame and a second frame, wherein determining the subset of pixels comprises identifying a first pixel of the first frame corresponding to a first region of interest, identifying a second pixel of the first frame corresponding to a second region of interest, and including the first pixel within the subset of pixels and excluding the second pixel from the subset of pixels;
generating a mask indicating the subset of pixels;
determining, based on the mask, one or more features associated with the subset of pixels of at least the first frame and the second frame;
determining optical flow vectors between the subset of pixels of the first frame and corresponding pixels of the second frame; and
generating an optical flow map for the second frame using the optical flow vectors.

16. The method of claim 15, further comprising determining the subset of pixels of at least the first frame and the second frame using a machine learning algorithm.

17. The method of claim 15, wherein determining the subset of pixels of at least the first frame and the second frame includes identifying at least one pixel corresponding to a boundary between two objects.

18. The method of claim 15, wherein determining the subset of pixels of at least the first frame and the second frame includes sampling a predetermined number of pixels within the first frame.

19. The method of claim 15, wherein the subset of pixels of at least the first frame and the second frame includes at least one pixel with adjacent pixels that are not included in the subset of pixels.

20. The method of claim 19, wherein determining, based on the mask, the one or more features includes:
determining feature information corresponding to the adjacent pixels of the at least one pixel; and
storing the feature information corresponding to the adjacent pixels in association with the at least one pixel.

21. The method of claim 20, further comprising determining an optical flow vector between the at least one pixel and a corresponding pixel of the second frame using the feature information corresponding to the adjacent pixels.

22. The method of claim 15, further comprising:
determining importance values for frames within a sequence of frames including the first frame and the second frame; and
selecting a frame within the sequence of frames for performing optical flow estimation based on the importance values.

23. The method of claim 22, further comprising selecting the second frame for performing optical flow estimation based on determining an importance value of the second frame exceeds a threshold importance value.

24. A computer-readable storage medium storing instructions that, when executed by one or more processors, cause the one or more processors to:
determining a subset of pixels of at least one of a first frame and a second frame, wherein the determining the subset of pixels includes identifying a first pixel of the first frame corresponding to a first region of interest, identifying a second pixel of the first frame corresponding to a second region of interest, and including the first pixel within the subset of pixels and excluding the second pixel from the subset of pixels;
generating a mask indicating the subset of pixels;
determining, based on the mask, one or more features associated with the subset of pixels of at least the first frame and the second frame;
determining optical flow vectors between the subset of pixels of the first frame and corresponding pixels of the second frame; and
generating an optical flow map for the second frame using the optical flow vectors.

25. The computer-readable storage medium of claim 24, wherein the instructions, when executed by the one or more processors, cause the one or more processors to determine the subset of pixels of at least the first frame and the second frame using a machine learning algorithm.

26. The computer-readable storage medium of claim 24, wherein, to determine the subset of pixels of at least the first frame and the second frame, the instructions, when executed by the one or more processors, cause the one or more processors to identify at least one pixel corresponding to a boundary between two objects.

27. The computer-readable storage medium of claim 24, wherein, to determine the subset of pixels of at least the first frame and the second frame, the instructions, when executed by the one or more processors, cause the one or more processors to sample a predetermined number of pixels within the first frame.

28. An apparatus for optical flow estimation between one or more frames, comprising:
a memory configured to store data corresponding to the one or more frames; and
one or more processors configured to:
determine a subset of pixels of at least one of a first frame and a second frame, the subset of pixels corresponding to key features within the at least one of the first frame and the second frame, wherein the key features include pixels that are in a first region of interest of the first frame but exclude pixels that are in a second region of interest in the first frame;
generate a mask indicating the subset of pixels;
determine, based on the mask, one or more contextual features associated with the subset of pixels of at least the first frame and the second frame;
determine optical flow vectors between the subset of pixels of the first frame and corresponding pixels of the second frame based on the one or more contextual features; and generate an optical flow map for the second frame using the optical flow vectors.

29. The apparatus of claim 28, wherein the subset of pixels of at least the first frame and the second frame includes at least one pixel with adjacent pixels that are not included in the subset of pixels, and determining the one or more contextual features includes determining contextual feature information corresponding to the adjacent pixels of the at least one pixel and storing the contextual feature information corresponding to the adjacent pixels in association with the at least one pixel.

30. An apparatus for optical flow estimation between one or more frames, comprising:
    a memory configured to store data corresponding to the one or more frames; and
    one or more processors configured to:
        determine a subset of pixels of at least one of a first frame and a second frame, wherein the subset of pixels of at least the first frame and the second frame includes at least one pixel with adjacent pixels that are not included in the subset of pixels;
        generate a mask indicating the subset of pixels;
        determine, based on the mask, one or more features associated with the subset of pixels of at least the first frame and the second frame, wherein determining the one or more features includes determining feature information corresponding to adjacent pixels of the at least one pixel, and storing the feature information corresponding to the adjacent pixels in association with the at least one pixel;
        determine optical flow vectors between the subset of pixels of the first frame and corresponding pixels of the second frame; and
        generate an optical flow map for the second frame using the optical flow vectors.

* * * * *